(12) United States Patent
Bostick et al.

(10) Patent No.: US 9,158,755 B2
(45) Date of Patent: Oct. 13, 2015

(54) CATEGORY-BASED LEMMATIZING OF A PHRASE IN A DOCUMENT

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

(*) Notice: Subject to any disclaimer, the term of this patent is extended or adjusted under 35 U.S.C. 154(b) by 335 days.

(21) Appl. No.: 13/663,563

(22) Filed: Oct. 30, 2012

(65) Prior Publication Data

US 2014/0122514 A1 May 1, 2014

(51) Int. Cl.
*G06F 17/30* (2006.01)
*G06F 17/27* (2006.01)

(52) U.S. Cl.
CPC ...... *G06F 17/2715* (2013.01); *G06F 17/30666* (2013.01)

(58) Field of Classification Search
CPC .................................................. G06F 17/30666
USPC .................................. 707/758, 739; 704/9, 10
See application file for complete search history.

(56) References Cited

U.S. PATENT DOCUMENTS

| | | | |
|---|---|---|---|
| 5,099,426 A * | 3/1992 | Carlgren et al. | 704/9 |
| 6,085,187 A | 7/2000 | Carter et al. | |
| 6,360,216 B1 | 3/2002 | Hennessey et al. | |
| 7,630,981 B2 | 12/2009 | Xu et al. | |
| 8,515,959 B2 * | 8/2013 | Cofino et al. | 707/739 |
| 2007/0282780 A1 * | 12/2007 | Regier et al. | 706/59 |
| 2008/0027893 A1 | 1/2008 | Cavestro et al. | |
| 2008/0154578 A1 | 6/2008 | Xu et al. | |
| 2009/0089277 A1 | 4/2009 | Cheslow | |
| 2009/0248432 A1 | 10/2009 | Earley, Jr. et al. | |
| 2010/0082333 A1 * | 4/2010 | Al-Shammari | 704/10 |
| 2011/0040552 A1 | 2/2011 | Van Guilder et al. | |
| 2011/0099181 A1 | 4/2011 | Aminian et al. | |
| 2011/0131247 A1 | 6/2011 | Brown et al. | |
| 2012/0078918 A1 | 3/2012 | Somasundaran et al. | |

OTHER PUBLICATIONS

U.S. Appl. No. 13/595,654—Non-Final Office Action Mailed Jul. 2, 2014.

(Continued)

*Primary Examiner* — Apu Mofiz
*Assistant Examiner* — Chelcie Daye
(74) *Attorney, Agent, or Firm* — John R. Pivnichny; Law Office of Jim Boice

(57) ABSTRACT

A processor-implemented method, system, and/or computer program product lemmatizes a phrase for a specific category. An initial phrase, which is associated with a specific category, is received by a processor. The processor removes a last letter or set of letters from a word in the initial phrase to form an initial truncated version of the phrase, and then runs a term frequency-inverse document frequency (TF-IDF) algorithm on the initial truncated version of the phrase. The processor lemmatizes subsequent truncated versions of the initial phrase, and then runs the TF-IDF algorithm until a highest TF-IDF value is identified for a specific truncated version of the initial phrase when compared to TF-IDF values of other truncated versions of the initial phrase. The specific truncated version of the initial phrase that is associated with the highest TF-IDF value is then associated with the specific category.

14 Claims, 2 Drawing Sheets

(56) References Cited

OTHER PUBLICATIONS

G. Miller et al., "Introduction to WordNet: An On-Line Lexical Database", EURALEX, International Journal of Lexicography, 1990, vol. 3, No. 4, pp. 235-244 (Revised Aug. 1993).
IBM, "IBM LanguageWare Resource Workbench", IBM, DeveloperWorks Communities, last updated Jul. 20, 2012, retrieved Aug. 19, 2014, pp. 1-3.
The Apache OpenNLP Team, "Apache OpenNLP 1.5.3 Released", The Apache Software Foundation, opennlp.apache.org, retrieved Aug. 19, 2014, pp. 1-2.
Snow et al., "Learning Syntactic Patterns for Automatic Hypernym Discovery," Stanford University, Advances in Neural Information Processing Systems (NIPS 2004), Dec. 13-18, 2004, Vancouver, British Columbia, pp. 1-8.
U.S. Appl. No. 13/595,654, Bostick et al., filed Aug. 27, 2012—Specification and Drawings.
Ahmed, et al., "Word Stemming to Enhance Spam Filtering," In Proceedings of the First Conference on Email and Anti-Spam (CEAS) (2004), University of Dhaka, Bangladesh, pp. 1-2.
Wikipedia.org, "TF-IDF," Oct. 2012, http://en.wikipedia.org/wiki/Tf-idf, pp. 1-2.
U.S. Appl. No. 13/595,654—Final Office Action Mailed Apr. 13, 2015.

* cited by examiner

CATEGORY-BASED LEMMATIZING OF A PHRASE IN A DOCUMENT

BACKGROUND

The present disclosure relates to the field of computers, and specifically to the use of documents in computers. Still more particularly, the present disclosure relates to the management of phrases in a document.

A document is a collection of tokens, which may be words, phrases, etc. Examples of documents include, but are not limited to, text documents, web logs (blogs), databases such as lists, etc., webpages, etc.

SUMMARY

A processor-implemented method, system, and/or computer program product lemmatizes a phrase for a specific category. An initial phrase, which is associated with a specific category, is received by a processor. The processor removes a last letter or set of letters from a word in the initial phrase to form an initial truncated version of the phrase, and then runs a term frequency-inverse document frequency (TF-IDF) algorithm on the initial truncated version of the phrase. The processor lemmatizes subsequent truncated versions of the initial phrase, and then runs the TF-IDF algorithm until a highest TF-IDF value is identified for a specific truncated version of the initial phrase when compared to TF-IDF values of other truncated versions of the initial phrase. The specific truncated version of the initial phrase that is associated with the highest TF-IDF value is then associated with the specific category.

DETAILED DESCRIPTION

Figure 1:
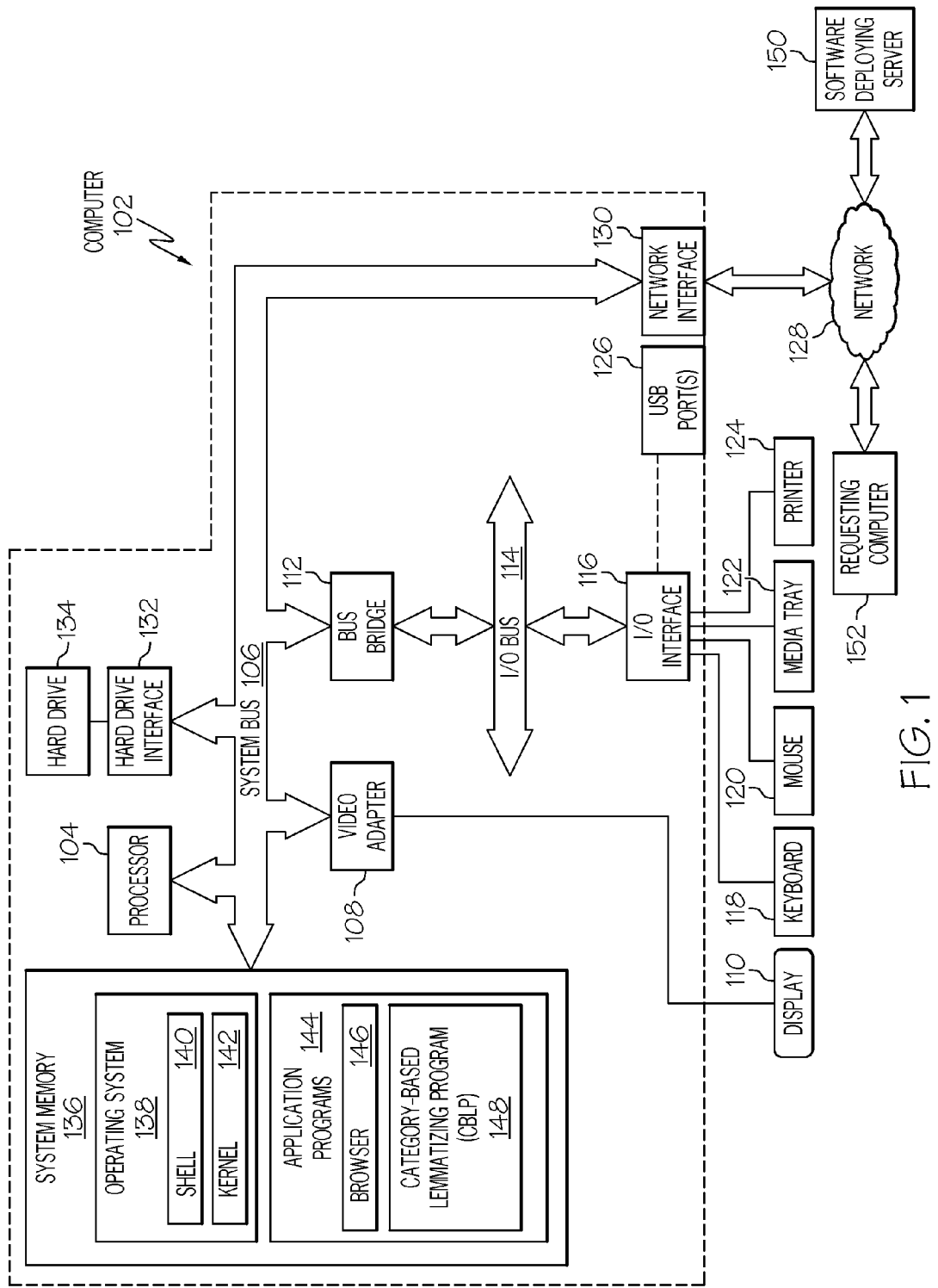
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150 and requesting computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a category-based lemmatizing program (CBLP) 148. CBLP 148 includes code for implementing the processes described below, including those described in FIG. 2. In one embodiment, computer 102 is able to download CBLP 148 from software deploying server 150, including in an on-demand basis, wherein the code in CBLP 148 is not downloaded until needed for execution. Note further that, in one embodiment of the present invention, software deploying server 150 performs all of the functions associated with the present invention (including execution of CBLP 148), thus freeing computer 102 from having to use its own internal computing resources to execute CBLP 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described herein, the present invention automatically finds a lemma for a token (e.g., word) or phrase (i.e., collection of words) with a high degree of accuracy.

Lemmatization is the process of grouping together different inflected forms of a word so they can be processed as a single term. For example, consider the scenario in which a user is searching for "walks". The user would expect to find a document with the following words {walk, walking, walked}. Lemmatization reduces these words to their morphological root.

As described herein, the present invention determines the morphological root for a token or phrase, as well as identifies/presents the lexeme of inflected forms of the token or phrase within that corpus.

Thus, within the context of the present disclosure, the following terms are defined as:
Lemma: the (morphological) root form of a word;
Lexeme: a minimal unit (as a word or stem) in the lexicon of a language. For example, "gone" and "going" are lexemes of the lemma "go";
Lemmatization: the process of determining the lemma for a given inflected word/lexeme;
Text Corpus: large and structured sets of text; and
Stemming: the lemmatization process of reducing inflected words to their stem, base or root form. The stem may or may not be the morphological root of the word.

In one embodiment, the present invention involves three steps: 1) Locate sequences of words/phrases and determine their frequency of use; 2) Ignore stop words that have no significance (e.g., possessive pronouns such as "his" and "her", articles such as "a" and "the", etc.). For the remaining non-stop words in the phrase, give them a frequency of use (term frequency—TF); 3) Filter the phrase by word suffixes and assign it a TF-IDF score. Repeat for that phrase until a word suffix/letter can or should no longer be removed. Continue to the next phrase. A highest (or similar) TF-IDF score for a phrase indicates a valid lemma for a particular lexeme phrase.

Step 1) described above locates contiguous sequences of words and obtains their term (i.e., phrase) frequencies. These sequences are formed by ignoring "stop words". As described herein, a stop word is a word that is so common that it imparts no meaningful information (e.g., "a", "and", "the", "if", "or", etc.). Grammatically, these typically include articles and conjunctions and subsets of other parts-of-speech that are deemed to be inconsequential to a phrase. However, one embodiment of the present invention does not rely on grammar, but first scans the entire corpus of a document/database to obtain the Term Frequency (TF) for every term/phrase in the corpus. In one embodiment, terms/phrases with a TF that reflect a significant percentage of the total terms/phrases in the corpus are added to a "stop words" list, since they are as common as previously-defined "stop words" (e.g., "a", "and", "the", "if", "or", etc.)

Step 2) described above scans the text for continuous sequences of words to find phrases that do not contain words on the stop words list. For example, consider the sentence "The quick brown fox jumped over the lazy dog." The following words are considered stop-words: "the" and "over". The phrase sequences are determined to be: "quick brown"; "quick brown fox" "quick brown fox jumped"; "brown fox" "brown fox jumped"; and "lazy dog". Each phrase is assigned a frequency (TF) and document frequency (DF). The document frequency (DF) is the number of documents that this phrase occurs in. Using these values, a Term Frequency-Inverse Document Frequency (TF-IDF) value is computed for each phrase (i.e., sequence of words).

Step 3) described above filters the phrase list to find phrases that are candidates for lemmatization. Common morphological word suffixes that are candidates for lemmatization are "-s"; "-es"; "-ed"; "-ing"; "-esses"; etc. If a phrase ends with one of these forms (such as "-s"), that ending is removed, and the remaining phrase is processed to create a TF-IDF score for that phrase. For example, the following TF-IDF scores for the phrase "business processes" from a phrase list may be:

"business processes", which has a TF-IDF=10.
Removing the "s" from "business processes: results in:
"business processe", which has a TF-IDF=0.
Removing the "-e" from "business processe" results in:
"business process", which has a TF-IDF=14.
Removing the "s" and then the "s" and then the "e" from "business process" results in:
"business proc", which has a TF-IDF=0.

In one embodiment, the ending removal (i.e., "stemming") is performed without regard to the underlying grammar, such that any lemma may be valid, regardless of whether it is a real word or not. In another embodiment, however, checking phrases such as "business processe" and "business proc" against a lookup table of valid phrases results in a determination that these are not valid phrases, and thus are not valid lemma of the phrase "business processes". In the latter embodiment then, "business process" has a TF-IDF score that is only slightly higher than "business processes". This indicates that, within the corpus being considered, "business process" occurs slightly less frequently than "business processes". However, since it does occur, and has a similar frequency (i.e., is not so frequent as to suggest that it is a meaningless "stop phrase"), then "business process" is deemed to be the best lemma. Thus, in this example, the best lemma for the lexeme "business processes" is determined to be the lemma "business process".

Figure 2:
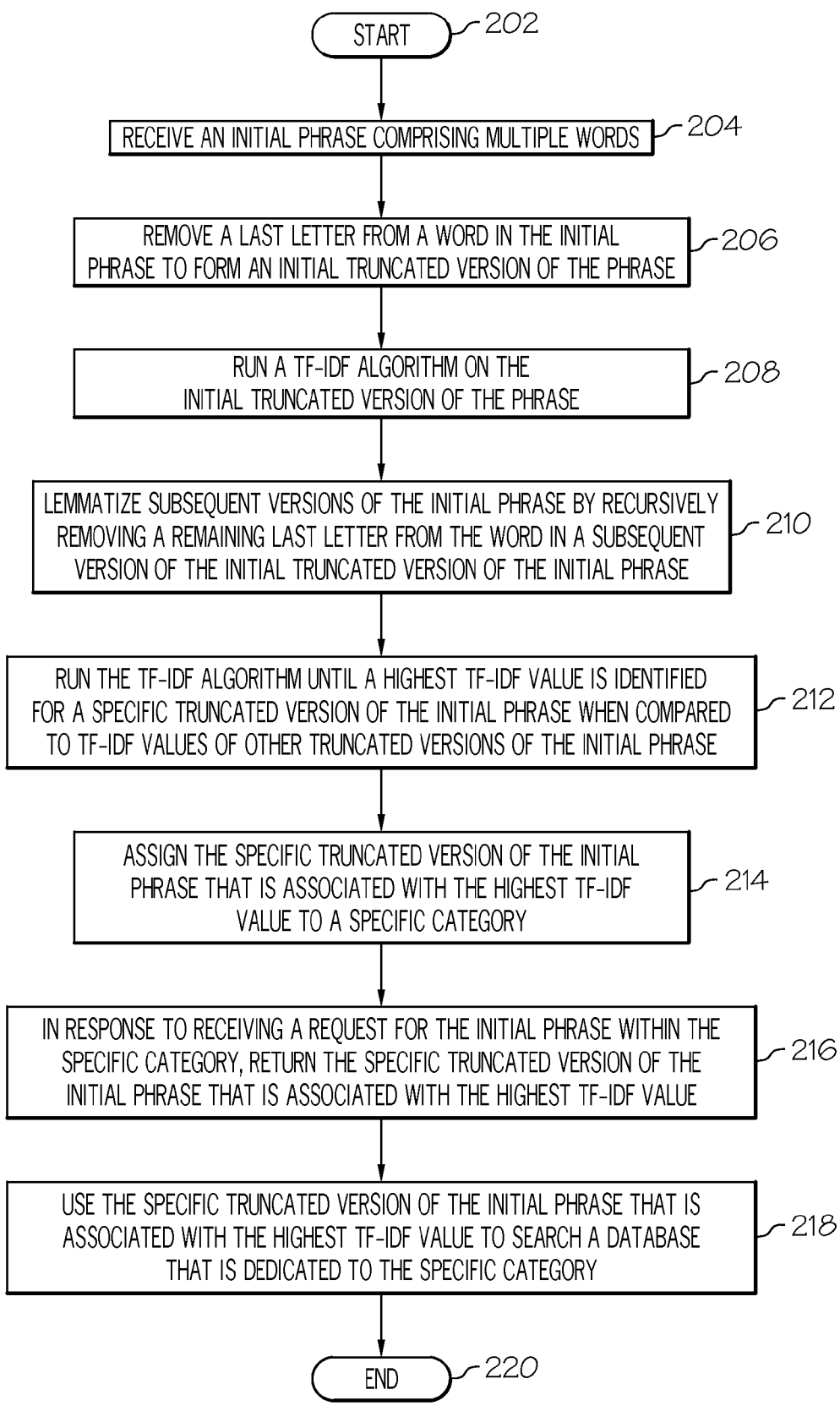
FIG. 2 is a high-level flow chart of one or more steps performed by a computer processor to lemmatize a phrase for a specific category.

With reference now to FIG. 2, a high-level flow chart of one or more steps performed by a computer processor to lemmatize a phrase for a specific category in accordance with one embodiment of the present invention is presented. After initiator block 202, a processor (e.g., processor 104 of computer 102 in FIG. 1) receives a string of binary data that represents an initial phrase (block 204). The phrase that is being lemmatized by the present invention is made up of multiple words. The initial phrase is associated with a specific category, such as a type of business, a field of academics, a particular subject matter, a particular geographic region that has a particular language/dialect, etc. That is, different categories have different lexicons, which are discussed further below. Thus, in one embodiment, the different lemmas described herein are dedicated to a specific category, which matches the specific category of a request for a phrase within that specific category. Determining which specific category the lemma is dedicated to can be performed by a lookup table that matches categories to lemmas, etc.

As described in block 206, a last letter from a word in the initial phrase is removed to form an initial truncated version of the phrase. This process is known as "stemming". In one embodiment, only the last letter is removed from the end of the word during stemming. In another embodiment, multiple predefined sets of letters, such as "-es", "ing", "-esses", are removed from the end of the word during stemming.

Note that in various embodiments that the "stemmed" word may or may not be the last word in the phrase. That is, in the examples above, the last word in the phrase was stemmed. However, other phrases may be better lemmatized by truncating earlier words in the phrase. For example, in the field of petroleum engineering, "packing off" is a phrase used to describe a wellbore that is plugged around a drill string. However, in the field of moving operations, the term "packing off" means to prepare someone for a move. Rather than letting "pack off" be the same lemma for "packing off" in both fields (petroleum engineering and moving operations), the lemma "pack off" is reserved (designated) for data searching text corpuses related to petroleum engineering (thus covering the lexemes "packs off", "packing off", "packed off", etc.), while the lemma "packing off" (and thus only covering the lexeme "packing off") is reserved for data searching text corpuses related to moving operations. Thus, petroleum engineering data searches are able to locate more data by using the broader lemma "pack off", while moving operation data searches locate a more limited, although more specific, data by using the dedicated lemma "packing off". Note that, in one embodiment, this dedication of certain lemma to specific fields (industries, academics, interests, etc.) also applies when stemming/lemmatizing a last word in a phrase.

Thus, as described above, in one embodiment a breadth of a scope of a data search is determined for a particular field/industry/subject. Based on this determined breadth of scope, a lemma that matches this breadth is assigned to that particular field/industry/subject, as described in the example above for the lexeme "packing off".

With reference now to block 208, the processor then runs a term frequency-inverse document frequency (TF-IDF) algorithm on the initial truncated version of the phrase. This TF-IDF algorithm identifies 1) how often the initial truncated version of the phrase occurs in a text corpus (to indicate that it is significant), as indicated by the term frequency TF; and 2) determines that the phrase does not occur so often in the text corpus that there is a presumption that the term is an inconsequential phrase (similar to a stop word), as indicated by the inverse document frequency IDF. Thus, the TF-IDF is calculated by the TF-IDF algorithm:

$$tfidf(t,c,D)=tf(t,d)\times idf(t,d)$$

where tf(t,d) is the frequency f that the term t occurs in a document d, and idf(t,d) is the log of the (total number of documents in the text corpus divided by the number of documents where the term t appears). Thus, if the lemma of the phrase does not occur at all within the text corpus, or if it occurs too often within the text corpus (i.e., the TF-IDF value approaches or is "0"), then it is deemed to be an invalid lemma. However, higher TF-IDF values indicate a more valid lemma.

As described in block 210, the processor then lemmatizes subsequent truncated versions of the initial phrase by recursively removing a remaining last letter from the word in each subsequent truncated version of the initial truncated version of the initial phrase, as depicted in the example above. The processor then re-runs the TF-IDF algorithm against each of the subsequent truncated versions of the initial phrase. The process of stemming and running the TF-IDF algorithm recursively occurs until 1) there are no more letters to be removed from the word in the phrase, or 2) no more valid lemma (e.g., real words that have meaning for their spelling, i.e., are found in a common dictionary) are found. Once the stemming/TF-IDF process ends, a highest TF-IDF value for a specific truncated version of the initial phrase is identified (block 212). This specific truncated version of the initial phrase has a TF-IDF value that is higher than any other truncated versions of the initial phrase, and is thus deemed to be the optimal lemma for this phrase. As defined herein, this specific truncated version of the initial phrase is then the lemma used when data searching for lexemes related to that lemma.

As described in block 214, the specific truncated (e.g., stemmed) version of the initial phrase that is associated with the highest TF-IDF value is for a specific category. As discussed above, different categories/fields have different lexicons. For example, consider the two categories/fields of "horror movies" and "medical surgery". In the category/field of "horror movies", "scare" would be an appropriate lemma for the lexemes "scare" and "scared". However, for the category/field of "medical surgery", "scar" would not be an appropriate lemma for "scare" or "scared", but would be an appropriate lemma for the lexemes "scars", "scarred", and "scarring". Thus, the lemma "scar" is an appropriate lemma in the category/field of "medical surgery", but not in the category/field of "horror movies", while "scare" would be the appropriate lemma in the category/field of "horror movies." Thus, each lemma is specific to a particular category/field, and is stored in a database that is dedicated to that particular category/field.

As described in block 216, in response to receiving a request for the phrase within a specific category, the specific truncated version of the initial phrase that is associated with the highest TF-IDF value is assigned to that specific category and returned to the requester. For example, if the specific category is "horror movies" and the user requests a data search for "scared", then the lemma "scare", and not "scar", is returned to the requester. If the specific category is "medical surgery" and the user requests a data search for "scarring", then the lemma "scar" is returned to the requester.

As described in block 218, the user can then use the returned lemma, for a specific subject/category/field, and which has the highest TF-IDF value, to search a database that is dedicated to the specific category. The process ends at terminator block 220.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of lemmatizing a phrase for a specific category, the processor-implemented method comprising:
    receiving, by a processor, a string of binary data that represents an initial phrase, wherein the initial phrase is an initial version of the phrase, wherein the phrase comprises multiple words, and wherein the phrase is associated with a specific category;

removing one or more letters from an end of a word in the initial phrase to form an initial truncated version of the phrase;

running, by the processor, a term frequency-inverse document frequency (TF-IDF) algorithm on the initial truncated version of the phrase;

the processor lemmatizing subsequent truncated versions of the initial phrase by recursively removing a remaining said one or more letters from the end of the word in a subsequent truncated version of the initial truncated version of the initial phrase;

the processor running the TF-IDF algorithm on subsequent truncated versions of the initial truncated version of the initial phrase until a highest TF-IDF value is identified for a specific truncated version of the initial phrase when compared to TF-IDF values of other truncated versions of the initial phrase;

assigning the specific truncated version of the initial phrase that is associated with the highest TF-IDF value to the specific category;

in response to receiving a request for the phrase within the specific category, returning the specific truncated version of the initial phrase that is associated with the highest TF-IDF value for said specific category; and using the specific truncated version of the initial phrase that is associated with the highest TF-IDF value for said specific category to search a database that is dedicated to the specific category.

2. The processor-implemented method of claim 1, wherein the specific category is a type of industry.

3. The processor-implemented method of claim 1, wherein the specific truncated version of the initial phrase is a lemma for a lexeme, and wherein the specific category defines a breadth of the lemma.

4. The processor-implemented method of claim 1, wherein the word in the initial truncated version whose last letter is removed is a last word in the initial phrase.

5. The processor-implemented method of claim 1, wherein the word in the initial truncated version whose last letter is removed is not a last word in the initial phrase.

6. A computer program product for lemmatizing a phrase for a specific category, the computer program product comprising a tangible computer readable storage medium having program code embodied therewith, the program code readable and executable by a processor to perform a method comprising:

receiving a string of binary data that represents an initial phrase, wherein the initial phrase is an initial version of the phrase, wherein the phrase comprises multiple words, and wherein the phrase is associated with a specific category;

removing a last letter from a word in the initial phrase to form an initial truncated version of the phrase;

running a term frequency-inverse document frequency (TF-IDF) algorithm on the initial truncated version of the phrase;

lemmatizing subsequent truncated versions of the initial phrase by recursively removing a remaining last letter from the word in a subsequent truncated version of the initial truncated version of the initial phrase;

running the TF-IDF algorithm on subsequent truncated versions of the initial truncated version of the initial phrase until a highest TF-IDF value is identified for a specific truncated version of the initial phrase when compared to TF-IDF values of other truncated versions of the initial phrase;

assigning the specific truncated version of the initial phrase that is associated with the highest TF-IDF value to the specific category;

in response to receiving a request for the phrase within the specific category, returning the specific truncated version of the initial phrase that is associated with the highest TF-IDF value for said specific category; and using the specific truncated version of the initial phrase that is associated with the highest TF-IDF value for said specific category to search a database that is dedicated to the specific category.

7. The computer program product of claim 6, wherein the specific category is a type of industry.

8. The computer program product of claim 6, wherein the specific category is an academic field of study.

9. The computer program product of claim 6, wherein the word in the initial truncated version whose last letter is removed is a last word in the initial phrase.

10. The computer program product of claim 6, wherein the word in the initial truncated version whose last letter is removed is not a last word in the initial phrase.

11. A computer system comprising:

a processor, a computer readable memory, and a computer readable storage medium;

first program instructions to receive a string of binary data that represents an initial phrase, wherein the initial phrase is an initial version of the phrase, wherein the phrase comprises multiple words, and wherein the phrase is associated with a specific category;

second program instructions to remove a last letter from a word in the initial phrase to form an initial truncated version of the phrase;

third program instructions to run a term frequency-inverse document frequency (TF-IDF) algorithm on the initial truncated version of the phrase;

fourth program instructions to lemmatize subsequent truncated versions of the initial phrase by recursively removing a remaining last letter from the word in a subsequent truncated version of the initial truncated version of the initial phrase;

fifth program instructions to run the TF-IDF algorithm on subsequent truncated versions of the initial truncated version of the initial phrase until a highest TF-IDF value is identified for a specific truncated version of the initial phrase when compared to TF-IDF values of other truncated versions of the initial phrase;

sixth program instructions to assign the specific truncated version of the initial phrase that is associated with the highest TF-IDF value to the specific category;

seventh program instructions to, in response to receiving a request for the phrase within the specific category, return the specific truncated version of the initial phrase that is associated with the highest TF-IDF value for said specific category; and eighth program instructions to use the specific truncated version of the initial phrase that is associated with the highest TF-IDF value for said specific category to search a database that is dedicated to the specific category; and wherein the first, second, third, fourth, fifth, sixth, seventh, and eighth program instructions are stored on the computer readable storage medium for execution by the processor via the computer readable memory.

12. The computer system of claim 11, wherein the specific category is a type of industry.

13. The computer system of claim 11, wherein the word in the initial truncated version whose last letter is removed is a last word in the initial phrase.

14. The computer system of claim 11, wherein the word in the initial truncated version whose last letter is removed is not a last word in the initial phrase.

\* \* \* \* \*